May 7, 1935.   H. A. W. WOOD   2,000,809
ROLL HANDLING MECHANISM
Original Filed Sept. 30, 1930   5 Sheets-Sheet 1
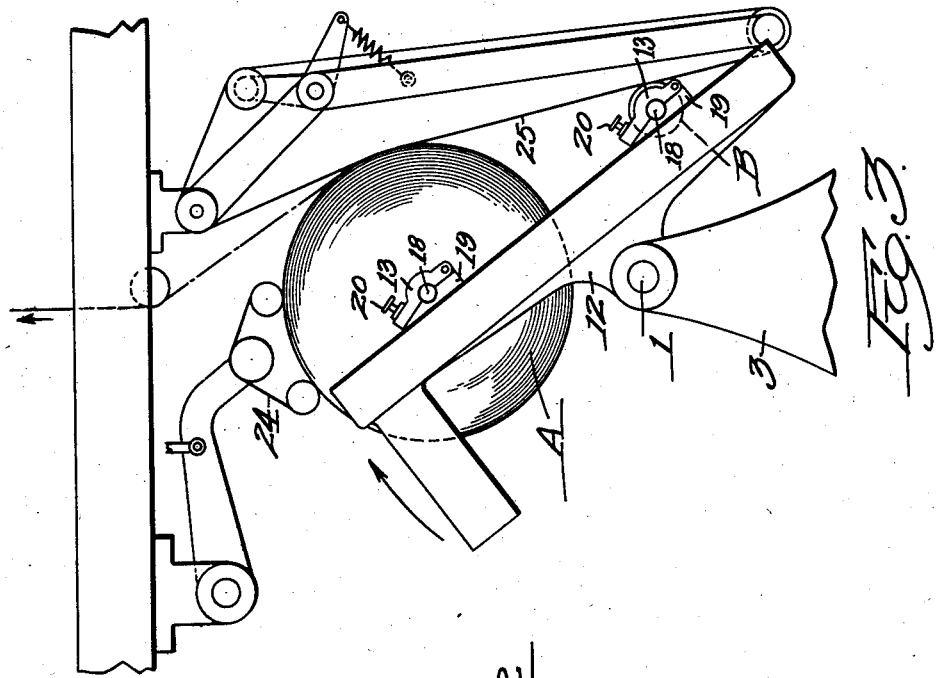
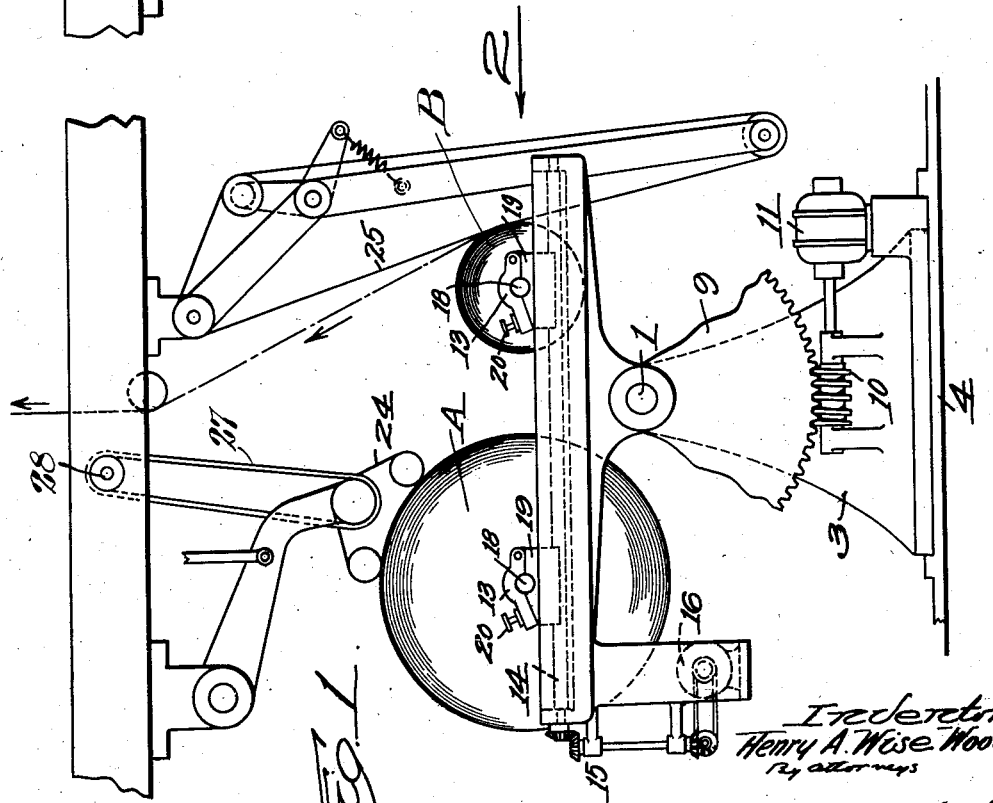

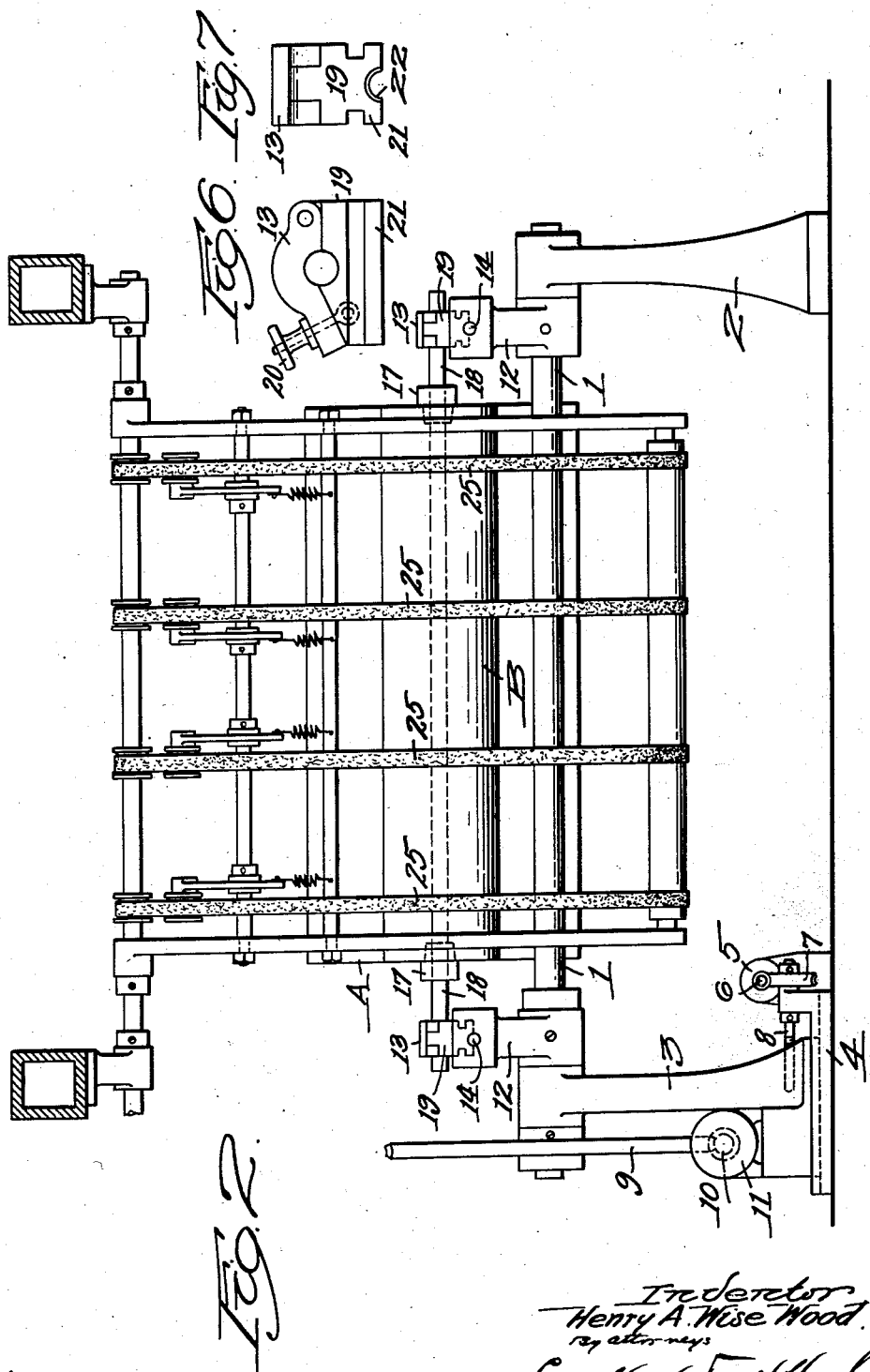

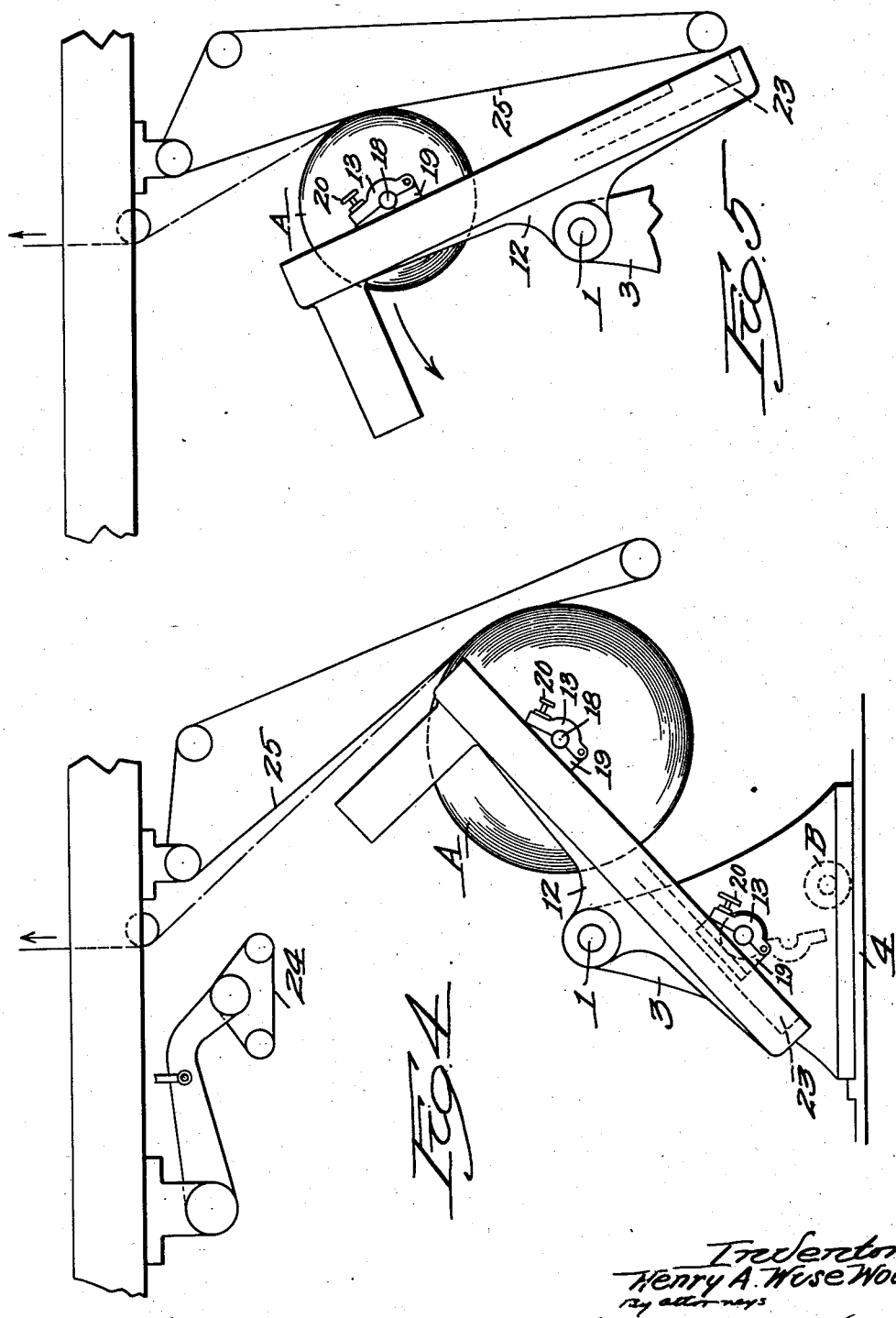

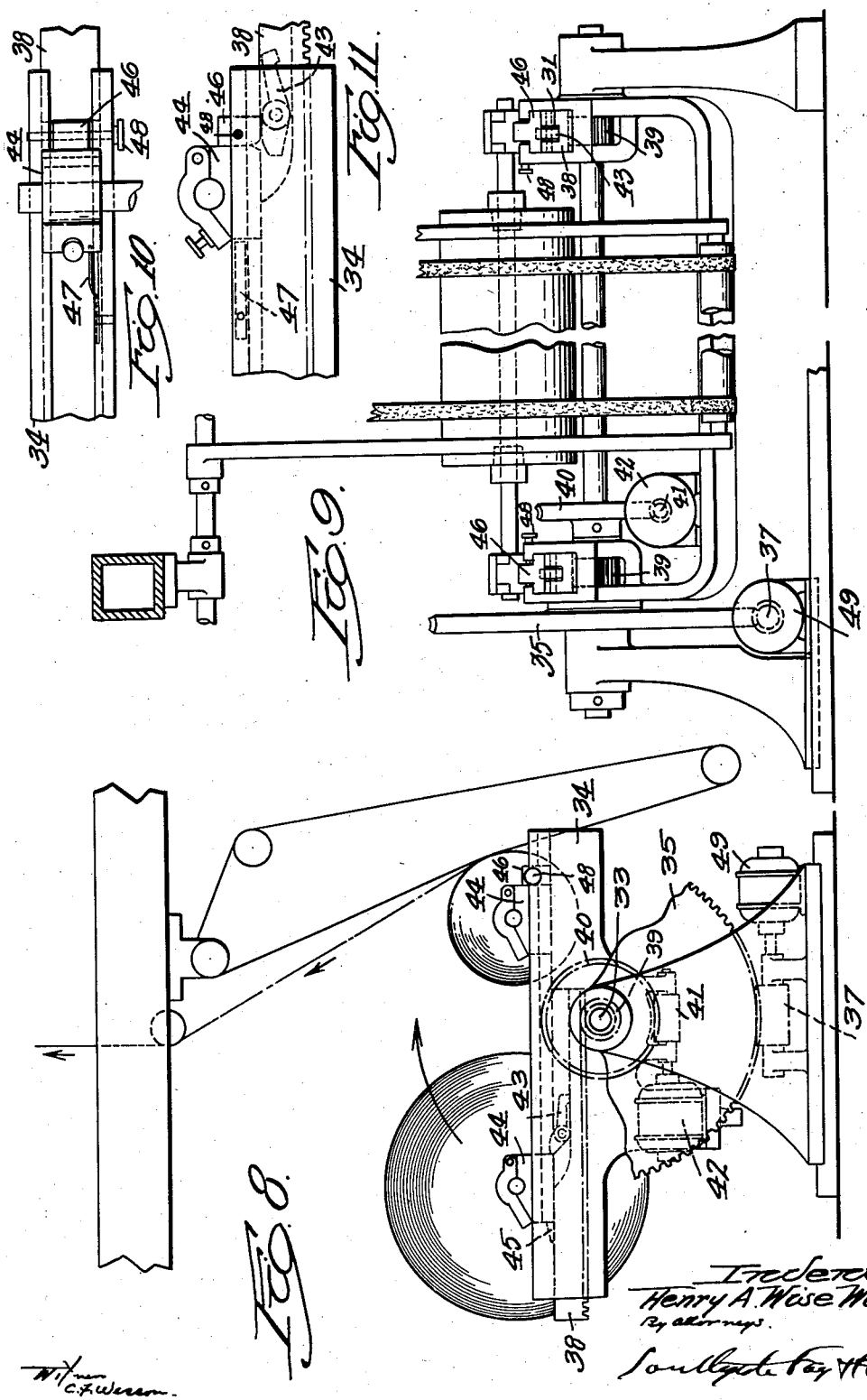

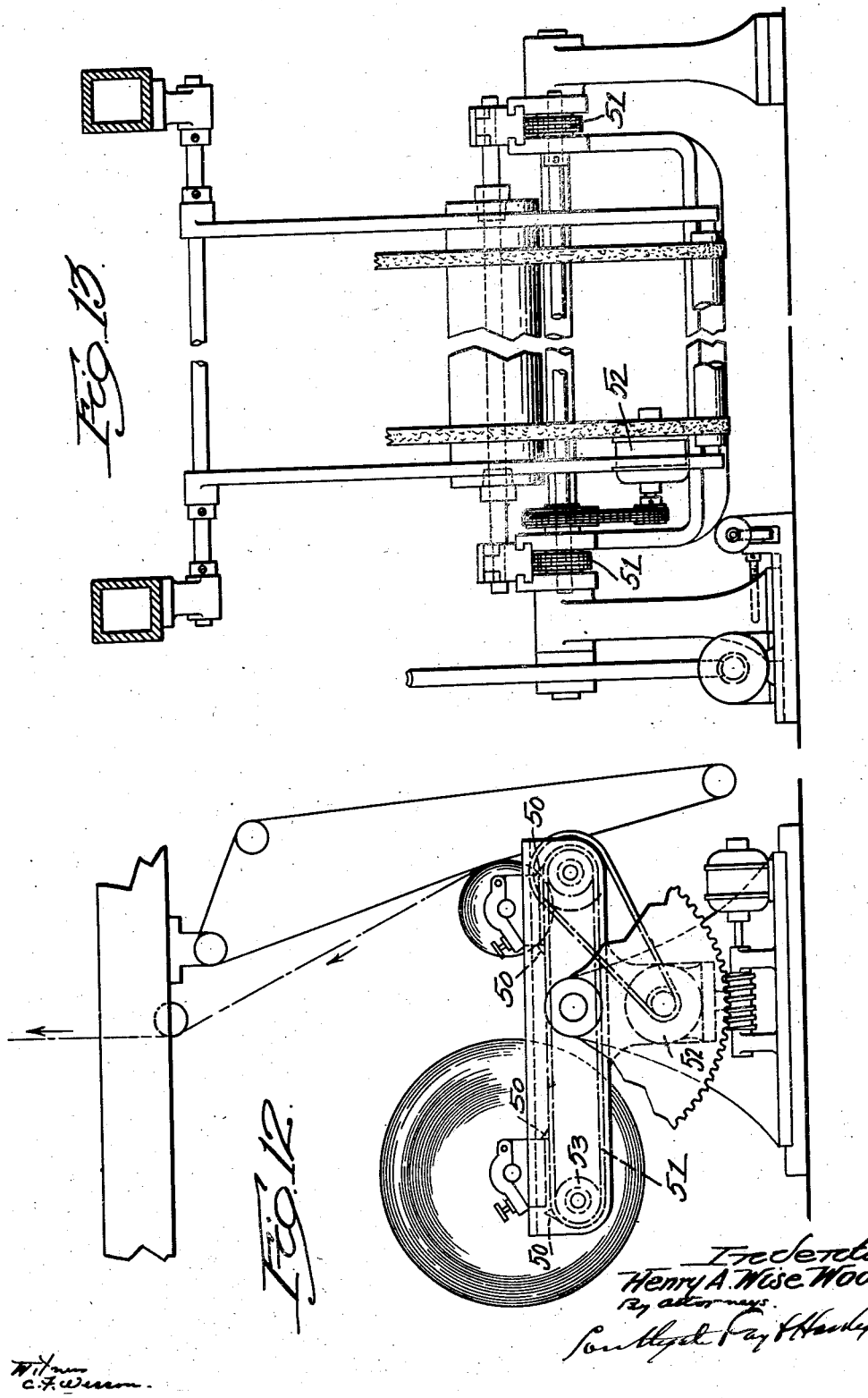

Patented May 7, 1935

2,000,809

UNITED STATES PATENT OFFICE 2,000,809

ROLL HANDLING MECHANISM

Henry A. Wise Wood, New York, N. Y., assignor to Wood Newspaper Machinery Corporation, New York, N. Y., a corporation of Virginia Application September 30, 1930, Serial No. 485,425
Renewed February 7, 1934

10 Claims. (Cl. 242—58)

This invention relates to a support for paper rolls used in feeding the web to a printing press.

The pricipal objects of the invention are to provide a simple and sturdy mechanism which can be reloaded with ease and be adapted to splice a new roll to the web when the running roll is exhausted and to provide a construction which can be installed in a small space.

Other objects and advantages of the invention will appear hereinafter.

Reference is to be had to the accompanying drawings, in which

Fig. 1 is a side view of a preferred embodiment of this invention showing it in the position in which the old roll is reduced in diameter considerably and the new roll is being started into rotation;

Fig. 2 is an elevation of the same;

Fig. 3 is a view similar to Fig. 1 showing the parts in the position in which the nearly exhausted stub has moved out of its usual running position and the new roll has moved into splicing position;

Fig. 4 is a similar view showing the further oscillation of the supporting frame in the same direction, in which the old roll bearings are moved down and opened to release the stub and the support has moved to its limiting position in this direction;

Fig. 5 is a similar view showing the support moved back and the new roll also moved up the support to its normal running position;

Fig. 6 is an enlarged side view of one of the bearings for supporting the studs of the rolls;

Fig. 7 is an end view thereof;

Fig. 8 is a view with the parts shown in the same position as Fig. 1, of a modified construction;

Fig. 9 is a side view thereof;

Fig 10 is a top view showing the spring detent for holding the bearing box in its extreme position;

Fig. 11 is a side view of the bearing box and the mechanism for releasing the holding pawl.

Fig. 12 is a view similar to Fig. 1 showing another modification, and

Fig. 13 is a view similar to Fig. 9 showing the latter construction.

The invention is shown in the first seven figures in a form involving a horizontal supporting shaft 1 rotatably mounted on pedestals 2 and 3, the shaft 1 being secured longitudinally with respect to the pedestal 3 by collars and the pedestal 2 being stationary. The support can be arranged to swing on some other axis than a horizontal one, if desired.

The pedestal 3 is guided in a base plate 4 by a tongue arrangement parallel to the shaft 1 which cooperates with a groove in the base plate permitting an endwise motion for side register. This is accomplished through a motor 5, worm 6, worm wheel 7 and screw 8. The screw is threaded into the pedestal itself. Therefore the rotation of the motor in either direction will move its shaft in its loose bearing in the pedestal 2 and change the side register.

The supporting shaft is intended to oscillate and for that purpose a worm wheel 9 is secured to the shaft and meshes with a worm 10 which is attached to, or a part of, the shaft of the motor 11 carried on a step of the pedestal 3. The rotation of the motor in either direction will swing the shaft 1 in one direction or the other and the supporting arms 12 with which it is provided. This pair of supporting arms constitutes the roll support. They are provided with a pair of lead screws 14 which, through a system of shafts and gears 15, are operated by a motor 16 carried by one of the supporting arms. These two lead screws 14 are connected to operate positively together.

The paper roll A is mounted by cone collars 17 detachably secured on the spindle 18. This spindle is carried in bearing boxes 19. Each bearing box has a hinged cap 13 normally held closed by a thumb screw 20. A tongue section 21 for operating in a groove of the support arm is also provided on each box and a threaded half hole 22 for cooperating with the lead screw 14.

At each end of the support arm there is a portion 23 cut out of the side of the T-slot transversely to allow the box 19 to be inserted or removed.

As this device is adapted to be used in connection with a web splicing mechanism, a caterpillar traction belt 24 is shown for setting the new web roll A in motion and also belts 25 for applying tension to the web but these features are not shown in detail as they constitute the subject matter of other applications now pending. I have shown the arrangement in which the tension is applied to the paper web by belts carried on a swinging arm and driven from the press at a speed slightly lower than web speed. This, of course, is old. With a given weighting of tension of the belt and speed ratio the paper tension can be varied by moving the belt arm away from its free swinging position. It will be noted that in this instance two means are provided for varying the tension. First, by oscillating the support and second by moving the running roll to and fro on the support.

The method of operation is shown by means of Figs. 1, 3, 4 and 5. Fig. 1 shows the loading position of the arms. The new roll A has just been put in place and the traction belt 24 brought down on it to bring it up to the speed necessary for splicing. This traction belt is normally inactive. When it is to be used a clutch (not shown) is thrown in to drive it from a press shaft 28 by means of a belt 27. The running roll B has previously been moved from the position of the roll A out along the arms by the lead screws 14 to the position in which it appears in this figure, as will appear more in detail.

It will be noticed that in this figure the support 12 is substantially horizontal. It is in that position that the new roll A is placed on the supporting device. Now the motor 11 is operated to swing the left-hand end of the support upwardly to the position shown in Fig. 3. In this position it will be seen that both the rolls A and B are in contact with the tension belts 25 and that the supporting frame is moved over to an inclined position. It is in this position that the paster is made. As soon as that is accomplished the exhausted stub B moves away from contact with the tension belts owing to the continued movement of the support 12 in the same direction. The support, however, continues to swing over to the position shown in Fig. 4 in which position the hinged caps 13 are released and dropped down as shown in dotted lines allowing the exhausted stub to fall down on the floor. It will be noticed that during all this time the lead screws 14 have not been turning. It will be understood that in the position shown in Fig. 4 the new roll has been run down the support slightly by the screws to a point at which the bearing boxes carrying the butt register with the cutout 23 in the T-slot so that the bearings can be taken out.

From the point shown in Fig. 4, which is the extreme position of the parts, the support commences to turn backwardly and in the position shown in Fig. 5 the roll A is in running position. Now the screws are turned by the motor 16 and the roll A runs down the support to the position B in Fig. 1, the support remaining substantially in the position shown in Fig. 5. When this roll gets down to about the size shown at B in Fig. 1, the frame is turned down to horizontal position again. The bearing boxes are inserted through the cutouts 23 in the loading ends of the support. Then a new roll is loaded in them and the cycle is repeated. The roll which has previously been designated A will be called B from now on because the new roll A has been provided.

This provides a very simple, strong and durable construction. Reloading can be accomplished very easily at the end of the support while that end is coming down to horizontal position and the new roll is kept in position where it can be speeded up to web speed and pasted to the old roll with comparative ease. The whole device requires a very small space. The support oscillates with a motion which is intermittent. It moves continuously from the position shown in Fig. 1 through that shown in Fig. 3 to that shown in Fig. 4 and then immediately swings back to the position shown in Fig. 5 where it remains stationary for a while and then it swings over to the position shown in Fig. 1. The screws 14 act before this latter motion to bring the gradually decreasing roll down from the position shown in Fig. 5 to the bottom of the support without withdrawing it from contact with the tension belts 25. This is the only time the motor 16 operates.

In Figs. 8 to 11 another form of the invention is shown. In this case the pedestals may be arranged as shown in the first form. The support shaft 33 of course is carried by these pedestals and the support 34 is carried free to oscillate on the shaft. The invention can be carried out with the support carried on a vertical axis but I have shown it in each case as swinging on a horizontal axis.

A worm wheel 35 is secured to the support 34. This worm wheel receives power through a worm 37 and motor 49. The motion of the new roll to and from the tension belts is not shown in full but is substantially of the same character as that described in the first embodiment of the invention illustrated in this case. It is provided through a ratchet and pawl arrangement on racks 38, one on each end, riding in T-slots 31 in the support 34. This arrangement is driven by pinions 39 secured to the shaft 33 which in turn is driven by a worm wheel 40, worm 41 and motor 42. A pawl 43 is pivotally mounted on the rack 38 so that when a bearing box 44 is placed in the support in the T-slot, a projection 45 abuts against it on one end. The short end of the pawl 43 on the other end holds it secured to the rack.

When the rack is moved to a nearly upright position, the short end of the pawl 43 is depressed by a removable stop 46. Then the rack 38 is free to return, leaving the bearing boxes 44 carrying the running roll in a low position, that is substantially the position indicated at the bottom of Fig. 3. The bearing box 44 is held in this position by the stop 46 and a spring-pressed catch 47 until the splice is made. After this the bearing boxes 44 may be removed sideways simply by withdrawing a pin 48 and removing the stop 46. The frame is reloaded at the upper end to repeat the cycle.

In Figs. 12 and 13 another embodiment of the invention is shown provided with means whereby the to and fro movement of the bearing boxes is accomplished by the projections 50 on special links of a chain 51, this chain being operated by a motor 52. The releasing of the box is obtained as the projections 50 pass over the sprocket 53 over which the chain passes. The other features shown in these two figures are substantially the same as those shown in the first seven figures and I will not describe it in detail.

In all these forms the invention is capable of being carried out in an efficient way and all the advantages above mentioned are secured.

Although I have illustrated and described only three forms of the invention I am aware of the fact that other modifications can be made therein by any person skilled in the art without departing from the scope of the invention as expressed in the claims. Therefore I do not wish to be limited in this respect but what I do claim is:—

1. In a web roll supporting device, the combination with a pivoted support and means for swinging the support on its pivot, of bearings mounted on said support, a lead screw connected with said bearing, and means for turning the lead screw to move the bearings along the support, whereby a roll supported by said bearings can be moved thereon.

2. In a web roll supporting device, the combination with a pivoted support and means for swinging the support on its pivot, of two sets of bearings mounted on said support, lead screws connected with said bearings, and means for turning the lead screws simultaneously to move the bearings along the support, whereby the rolls supported by said bearings can be moved into different positions thereon for making a paster and for running the web from the roll thereafter.

3. In a device of the character described, the combination with a support mounted to swing on a horizontal axis, a motor for turning said support on its axis, a pair of lead screws carried by the support, a second motor carried by the support for operating said lead screws, and bearings for web rolls guided along said support and having openings fitting said lead screws, whereby the turning of the lead screws will move the bearings along the support.

4. In a device of the character described, the combination with a support mounted to swing on a horizontal axis, a motor for turning said support on its axis, a pair of lead screws carried by the support, a second motor carried by the support for operating said lead screws, bearings for web rolls guided along said support and having openings fitting said lead screws, whereby the turning of the lead screws will move the bearings along the support, and tension belts in position to engage a roll carried by the bearings when moved to a certain position on the supports to guide the web therefrom and exert a resistance against the web feeding too fast.

5. In a web roll supporting device, the combination with a support mounted to swing on a horizontal axis, means for turning the support about said axis, bearings on the support for web rolls, means for moving said bearings along the support to change the position of the web rolls thereon, means adapted to engage the surface of a new web roll to rotate it up to web speed before pasting and means adapted to engage the web roll at the time of pasting and thereafter to retard the web and keep it from flooding the press.

6. In a web roll supply device, the combination with a support pivoted to swing on a horizontal axis and web rolls adjustable in said support in a direction transverse to said axis, of means for turning the support from a horizontal position to an inclined position for pasting without changing the adjusted position of the rolls, then around to a reversely inclined position to admit of the discharge of the exhausted stub while the new web roll is located thereon and for then swinging the support back to the first inclined position to bring the new roll into running position.

7. In a web roll supply device, the combination with a support pivoted to swing on a horizontal axis, web rolls movably mounted on said support and means independent of the motion of said support for moving said web rolls on said support in a direction transverse to said axis, of means for turning the support from a position in which it is adapted to receive a fresh web roll to an inclined position for pasting, then around to a reversely inclined position to admit of the discharge of the exhausted stub and for then swinging the support back to bring the new roll into running position.

8. In a web roll supporting device, the combination with a pivotally mounted support and means for turning it on its pivot, of bearings movably carried by said support and means for moving said bearings along the support, said means comprising a rack on the support, a wheel for operating the rack, and a movable latch carried by the rack for engaging and moving a bearing.

9. In a web roll supporting device, the combination with a movably mounted support and means for moving it, of bearings movably carried by said support and means for moving said bearings along the support, said means comprising a rack on the support, a wheel for operating the rack, a movable latch carried by the rack for engaging and moving a bearing, and means whereby the rack can move back without taking the bearing with it.

10. In a device for handling web rolls, the combination of a movable support, bearings laterally movable on said support for a fresh roll of paper, a normally inactive means adapted to drive said fresh roll to rotate the same and bring it up to web speed, and means for moving the support to effect contact of said fresh roll with a traveling web from an expiring roll carried by said support.

HENRY A. WISE WOOD.